United States Patent
Coulombe et al.

(10) Patent No.: US 7,043,560 B2
(45) Date of Patent: May 9, 2006

(54) DYNAMIC PROBING AND REPORTING OF BIT RATE INFORMATION

(75) Inventors: Stephane Coulombe, Irving, TX (US); Guido Grassel, Espoo (FI); Fred Ware, Dallas, TX (US); Suresh Chitturi, Euless, TX (US)

(73) Assignee: Nokia, Inc., Irving, TX (US)

( * ) Notice: Subject to any disclaimer, the term of this patent is extended or adjusted under 35 U.S.C. 154(b) by 733 days.

(21) Appl. No.: 09/883,208

(22) Filed: Jun. 19, 2001

(65) Prior Publication Data
US 2003/0055949 A1 Mar. 20, 2003

(51) Int. Cl.
*G06F 15/16* (2006.01)

(52) U.S. Cl. .............. 709/232; 709/203; 709/217; 370/231; 370/232

(58) Field of Classification Search ........ 709/231–235, 709/218, 219, 223, 203, 217; 370/231–233
See application file for complete search history.

(56) References Cited

U.S. PATENT DOCUMENTS

| | | | |
|---|---|---|---|
| 5,802,106 A | | 9/1998 | Packer |
| 5,835,495 A | | 11/1998 | Ferriere |
| 5,918,020 A | * | 6/1999 | Blackard et al. ............ 709/228 |
| 6,023,725 A | | 2/2000 | Ozawa et al. |
| 6,044,089 A | | 3/2000 | Ferriere |
| 6,076,113 A | | 6/2000 | Ramanathan et al. |
| 6,088,392 A | * | 7/2000 | Rosenberg ............. 375/240.03 |
| 6,115,357 A | | 9/2000 | Packer et al. |
| 6,119,235 A | * | 9/2000 | Vaid et al. .................. 713/201 |
| 6,128,649 A | | 10/2000 | Smith et al. |
| 6,178,450 B1 | | 1/2001 | Ogishi et al. |
| 6,292,465 B1 | * | 9/2001 | Vaid et al. .................. 370/230 |
| 6,341,309 B1 | * | 1/2002 | Vaid et al. .................. 709/223 |
| 6,347,094 B1 | * | 2/2002 | Gopalakrishnan ........... 370/464 |
| 6,351,471 B1 | * | 2/2002 | Robinett et al. ............ 370/468 |
| 6,442,603 B1 | * | 8/2002 | Borella ....................... 709/218 |
| 6,515,965 B1 | * | 2/2003 | Hou et al. .................. 370/233 |
| 6,701,372 B1 | * | 3/2004 | Yano et al. ................. 709/232 |
| 2002/0024969 A1 | | 2/2002 | Heiles |
| 2002/0185970 A1 | | 11/2002 | Ludewig |

OTHER PUBLICATIONS

Search Report (dated Mar. 20, 2003), International Application No. PCT/IB02/02398.

* cited by examiner

*Primary Examiner*—Jeffrey Pwu
*Assistant Examiner*—Phuoc H. Nguyen
(74) *Attorney, Agent, or Firm*—Banner & Witcoff, Ltd.

(57) ABSTRACT

A method and apparatus are provided for measuring a bit rate between a client and a server. In an embodiment of the invention, a number of bits included only within one or more transaction units are measured over a time period. The time period is a sum of time durations of each of the transaction units. In an embodiment of the invention, bit rate measurements are performed on a server and in another embodiment of the invention bit rate measurements are performed on a client. Embodiments of the invention include adapting, by the server, of content to be sent to the client based on the bit rate measurements. Embodiments of the invention further include reporting the measured bit rate to the server when the bit rate measurements are performed on the client. Other aspects of the invention include sending an indication of the measured bit rate and a desired bit rate to the server when bit rate measurements are performed in the client.

42 Claims, 11 Drawing Sheets

| Attribute | Description | Sample Values |
|---|---|---|
| Bit Rate | The bit rate perceived by a device at the application or transport layer. | "9600-14400"<br>"28800-28800"<br>"14400"<br>Medium |
| Desired Bit Rate | The maximum bit rate at which the device desires to receive data. | "14400"<br>"28800" |

FIG. 7

DYNAMIC PROBING AND REPORTING OF BIT RATE INFORMATION

FIELD OF THE INVENTION

Aspects of the invention relate to information browsing, and telecommunications. In particular, aspects of the invention relate to a method and apparatus for measuring a perceived bit rate and adjusting data content accordingly.

BACKGROUND OF THE INVENTION

The mobile communications industry is in the process of undergoing significant change. New terminals are introduced on the market with very different multimedia capabilities, resolutions, screen size, etc. The new terminals can and will connect to various networks, such as: GSM, TDMA, GPRS, EDGE, WCDMA, etc. Each network can provide a different bit rate to a user. The bit rate can range from a few kilobits per second (kbps) to hundreds of kbps.

The amount of time required to transfer information is directly affected by the available bit rate. In information browsing, very long transfer times are usually unacceptable to a user. If a server had information about a perceived bit rate by a terminal, the server could adapt the content that it sends to the client, accordingly. However, in general, network elements between a server and a client can be complex and cannot be modeled by a single bit rate parameter.

In prior art information browsing, the pages to send to a client are decided based on hardware and browser software used; however, the content is sent regardless of the bit rate.

Video streaming systems adapt the content to network conditions, but do not actually explicitly compute the bit rate. Instead, such systems apply congestion control techniques to pace the data sent to the client. Congestion control is performed by controlling the number of unacknowledged packets (called a window) sent to a client.

Methods described in U.S. Pat. Nos. 5,802,106 and 6,076,113 compute the bit rate for TCP communications by measuring amounts of data received per unit of time without considering idle time between transactions and are therefore, not suitable methods for information browsing.

BRIEF SUMMARY OF THE INVENTION

A method and apparatus are provided for measuring a bit rate between a client and a server. In an embodiment of the invention, a number of bits included only within one or more transaction units are measured over a time period. The time period is a sum of time durations of each of the transaction units.

In one embodiment of the invention, bit rate measurements are performed on a server and in another embodiment of the invention bit rate measurements are performed on a client.

Embodiments of the invention include adapting, by the server, of content to be sent to the client based on the bit rate measurements. Embodiments of the invention further include reporting the measured bit rate to the server when the bit rate measurements are performed on the client.

Because embodiments of the invention measure the bit rate only during transaction units, long idle periods between transactions will not affect the bit rate measurements. Further, in some embodiments, bit rate measurements are performed at an application level in the client and reported to a respective server, such that the bandwidth of inactive applications can be reallocated to active applications.

Other aspects of the invention include sending an indication of the measured bit rate and a desired bit rate to the server when bit rate measurements are performed in the client.

BRIEF DESCRIPTION OF THE DRAWINGS

FIG. 7 is a table which shows new messages that may be sent from a client to a server;

DETAILED DESCRIPTION OF THE INVENTION

Figure 1:
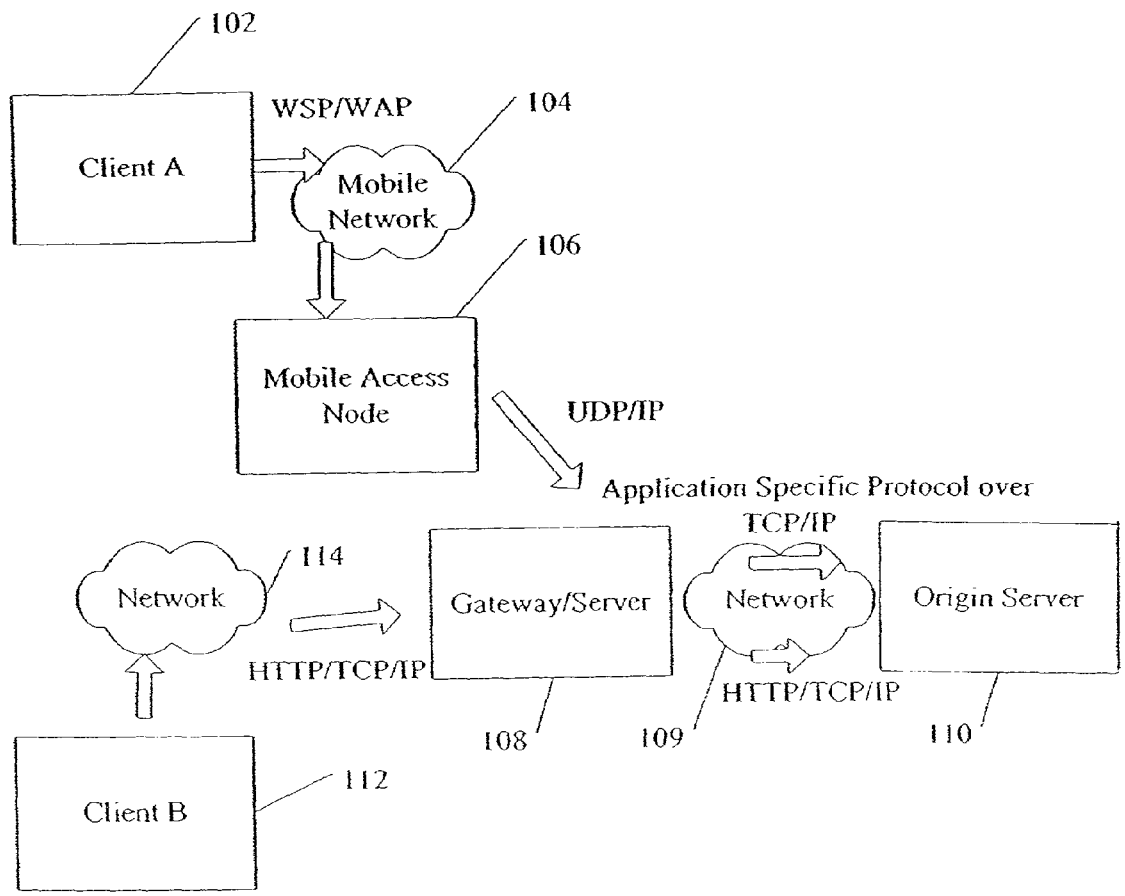
FIG. 1 illustrates a data network access system.

FIG. 1 illustrates a data network access system, wherein client A 102 is a wireless client using the Wireless Application Protocol (WAP) to access a network. Client A accesses origin server 110 via, for example, a mobile network 104 and a mobile access node 106 using, for example, the Point-to-Point Protocol (PPP). WAP and PPP are protocols which are well known in the art.

The mobile access node 106 communicates with Gateway/Server 108 using, for example, the User Datagram Protocol/Internet Protocol (UDP/IP), which is well known in the art. Because of the layered structure of communication protocols, a communication is ultimately established between the client A and the Gateway/Server 108 with, for instance, the higher-level WAP protocols Wireless Session Protocol/Wireless Transport Protocol/Wireless Datagram Protocol (WSP/WTP/WDP), which are well known in the art. The Gateway/Server 108 communicates with a network 109 and the origin server 110 using, for example, Transmission Control Protocol/Internet Protocol (TCP/IP) or HyperText Transport Protocol/Transaction Control Protocol/Internet Protocol (HTTP/TCP/IP), which are well known in the art.

A client, such as client B 112 may also communicate with origin server 110 via network 114 using, for example, HTTP/TCP/IP through Gateway/Server 108 and network 109 to origin server 110.

An embodiment of the invention dynamically estimates the average perceived bit rate of a network separating a client and a server. One embodiment of the invention performs the estimation on the server side. The server is an entity that sends data to another entity called a client. The client may be, for example, a wireless device, such as a phone or a terminal.

Figure 2:
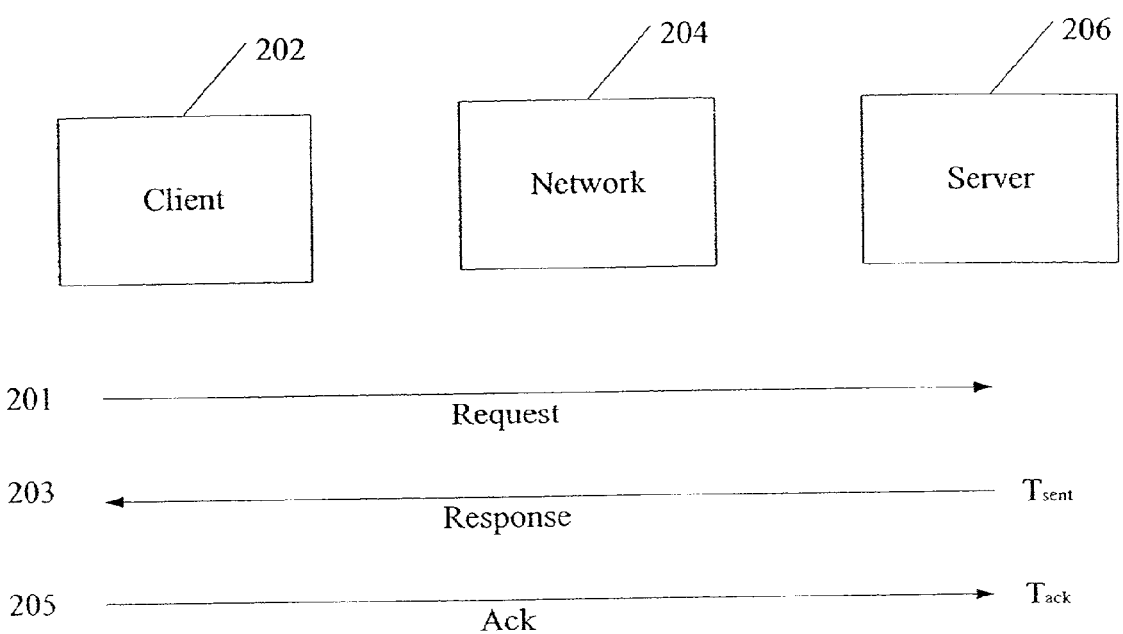
FIG. 2 shows an example of client/server communication through a network in a context of, for example, information browsing.

FIG. 2 shows an example of client/server communication through a network in a context of, for example, information browsing.

At 201, client 202 sends a request through network 204 to server 206. At time $T_{sent}$, the server 206 sends a response to client 202 through network 204 (see 203).

At 205, client 202 sends an acknowledgement to server 206. The acknowledgement is received at time $T_{ack}$.

A transaction pair includes a message and a response to the message. For example, in FIG. 2 the transaction pair may be the request and the response or the response and the acknowledgement.

A transaction unit is one or more transaction pairs that do not overlap in time with any other transaction pair outside of the transaction unit, such that if more than one transaction pair exists within the transaction unit, the transaction pairs within the transaction unit overlap with one another.

In order to estimate the bit rate in an embodiment of the invention, for each transaction unit, an amount of data transferred in bits, the time the response was sent and the time the acknowledgement was received are tracked.

Figure 3A:
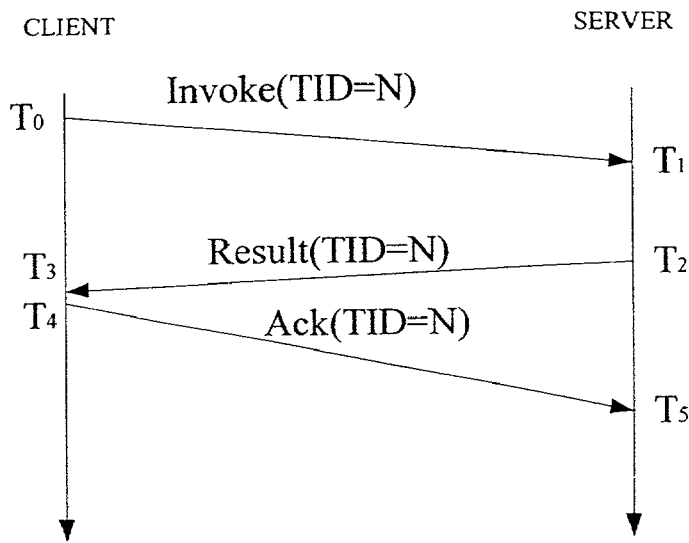
FIGS. 3A through 3C show examples of requests and responses between a client and a server.

FIG. 3A shows a typical transfer of a request and a response between a client or initiator and a server or responder. At time $T_0$ an invoke message is transmitted to the server. The invoke message arrives at the server at time $T_1$. At time $T_2$ the server transmits a result message to the client. The result message arrives at the client at time $T_3$. The client transmits an acknowledgement message to the server at time $T_4$. The acknowledgement message arrives at the server at time $T_5$. Note that in FIGS. 3A through 3C, TID represents a transaction ID or number.

Data is transmitted between the client and the server in Response-Acknowledgement Transaction Pairs (RATPs), herein referred to as $T_r(i)$, where i is an index.

The amount of data exchanged, P, equals the sum of an amount of data, in bits, of the RATPs. The amount of data exchanged in $T_r(i)$, for example, is P(i). The time, in seconds, that the response was sent is referred to as $T_{resp}(i)$ and the time, in seconds, that the acknowledgement was received, is referred to as $T_{ack}(i)$.

FIG. 3A shows one RATP. $T_{resp}(i)$ corresponds to $T_2$ and $T_{ack}(i)$ corresponds to $T_5$.

In an alternate embodiment $T_{resp}(i)$ can be replaced by $T_{req}(i)$, the time the request was received by the server, corresponding to $T_1$ in FIG. 3A. In the alternate embodiment, the bit rate would include latency time at the server to process the request.

A Response Acknowledgement Transaction Unit (RATU) referred to as $T_{ru}(i)$, is a minimal set of RATP which do not overlap in time with any other RATP.

Mathematically, an RATU is a set of RATP, or $T_r(k)$ with indices in a set S such that:

$$[T_{resp}(k), T_{ack}(k)] \cap [T_{resp}(i), T_{ack}(i)] = \{\ \}, \forall k \in S, \forall (i) \in S, \quad \text{[Equation 1]}$$

where $[T_{resp}(k), T_{ack}(k)]$ represents a time interval from $T_{resp}(k)$ to $T_{ack}(k)$. S is a minimal set, such that there do not exist non-empty sets $S_1$ and $S_2$ such that $S_1 \cup S_2 = S$ and $S_1 \cap S_2 = \{\ \}$, and that:

$$[T_{resp}(k), T_{ack}(k)] \cap [T_{resp}(i), T_{ack}(i)] = \{\ \}, \forall k \in S_1, \forall i \in S_2. \quad \text{[Equation 2]}$$

Figure 3B:
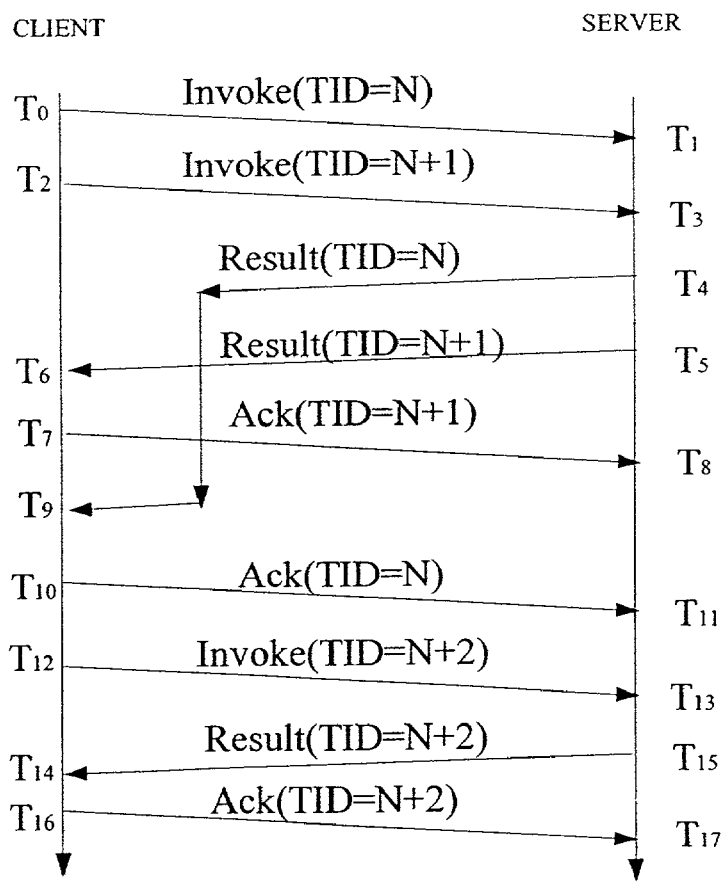

FIG. 3B helps to explain the concept of an RATU. At time $T_0$, the client or initiator sends an invoke message which, due to network delays, reaches the server at time $T_1$. At time $T_2$ the client sends another invoke message to the server. The second invoke message reaches the server at time $T_3$. The server sends a result (or response) message to the client, responding to the first invoke message, at time $T_4$. At time $T_5$, the server sends a result message to the client, responding to the second invoke message, which reaches the client at time $T_6$ (that is before the first result message reaches the client). The client transmits an acknowledgement to the server to acknowledge receipt of the second result message at time $T_7$. The acknowledgement is received at the server at time $T_8$. At time $T_9$, the first result message finally reaches the server. At time $T_{10}$, the server transmits an acknowledgement to the server to acknowledge receipt of the first result message. The acknowledgement is received by the server at time $T_{11}$. Transaction N+2 follows similarly.

One can see that the RATP corresponding to the messages having the tag TID=N overlaps with the RATP with tag TID=N+1. Indeed, for TID=N, $T_4$ corresponds to $T_{resp}(N)$ and $T_{11}$ corresponds to $T_{ack}(N)$. For TID=N+1, $T_5$ corresponds to $T_{resp}(N+1)$ and $T_8$ corresponds to $T_{ack}(N+1)$. They clearly overlap since $T_{resp}(N) < T_{resp}(N+1)$ while $T_{ack}(N) > T_{ack}(N+1)$. However, they don't overlap with transaction N+2 since $T_{ack}(N) < T_{resp}(N+2)$ and $T_{ack}(N+1) < T_{resp}(+2)$. Thus transactions N and N+1 correspond to one RATU. We can see the RATU satisfies equations (1) and (2) and $[T_4, T_{11}]$ corresponds to the time period of the RATU.

Further, one can see that a second RATU, corresponding to transaction N+2, has a time period defined by $[T_{15}, T_{17}]$.

Figure 3C:
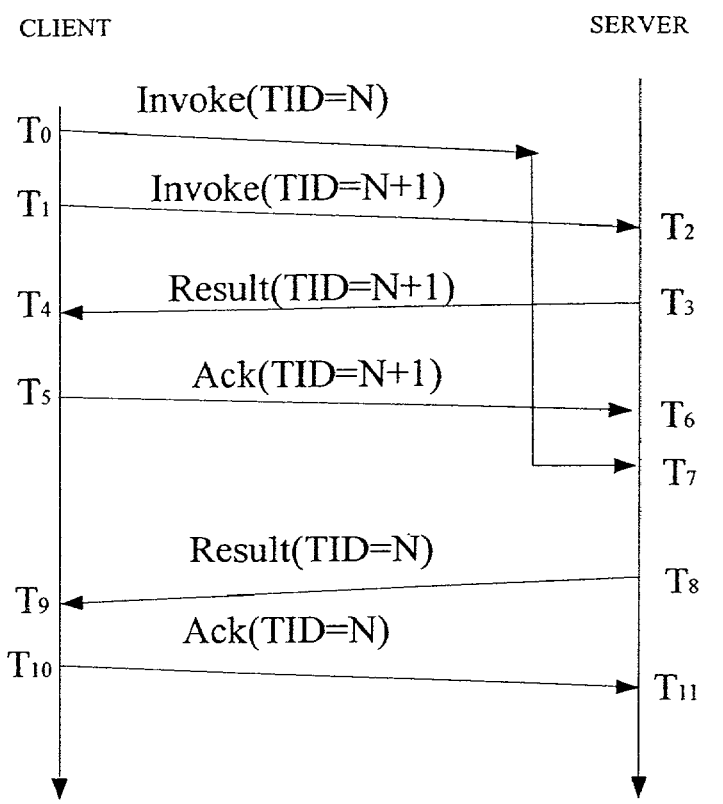

FIG. 3C shows another example in which the client, at time $T_0$ sends an invoke message to the server; however, due to network delays, the invoke message does not arrive until time $T_7$. In the meantime, at time $T_1$ the client transmits a second invoke message to the server, which is received at time $T_2$. At time $T_3$, the server sends a result message to the client in response to the second invoke message (TID=N+1), which the client receives at time $T_4$. At time $T_5$, the client transmits an acknowledgement with a TID=N+1 acknowledging receipt of the result message having a TI=N+1. The message is received at time $T_6$. At time $T_7$, the first invoke message is received by the server. At time $T_8$, a result message, in response to the first invoke (TID=N), is transmitted from the server to the client. The client receives the result message at time $T_9$. At time $T_{10}$, the client transmits an acknowledgement with a TID=N acknowledging receipt of the result message having a TID=N. The acknowledgement is received at the server at time $T_{11}$.

Based on equations 1 and 2, one can see that the transactions N and N+1 form two distinct RATUs since they represent non-overlapping RATPs. Indeed, their result and acknowledgement transactions don't overlap.

An RATU is characterized by the total amount of data exchanged during the period it covers defined as:

$$P_u(j) = \sum_{i \in S_j} P(i), \quad \text{[Equation 3]}$$

where $P_u(j)$ is the total amount of data in a $j^{th}$ RATU and P(i) is the total amount of data in an $i_{th}$ RATP composing that RATU. $S_j$ is the set of indices, corresponding to RATPs, composing the $j^{th}$ RATU).

The time (in seconds) in which the first RATP response was sent is defined as:

$$T_{Resp}^u(j) = \min_{i \in S_j}[T_{Resp}(i)], \quad \text{[Equation 4]}$$

where j is an index, such that $T_{resp}^u(j)$ corresponds to a response in the $j_{th}$ RATU and $S_j$ refers to the set of indices, corresponding to RATPs, within the RATU.

The time (in seconds) where the last RATP acknowledgement was received is defined as:

$$T_{Ack}^u(j) = \max_{i \in S_j}[T_{Ack}(i)] \quad \text{[Equation 5]}$$

The time difference between a first response and a last acknowledgement in an RATU is defined as:

$$\Delta T_u(j) = T_{Ack}^u(j) - T_{Resp}^u(j) \quad \text{[Equation 6]}$$

Each RATU, $T_{ru}(j)$, is ordered such that:

$$T_{Resp}^u(j-1) < T_{Resp}^u(j) < T_{Resp}^u(j+1), \forall j > 0 \quad \text{[Equation 7]}$$

In an embodiment of the invention, the bit rate is estimated as an average amount of data transferred over a specific period of time T, for example, 30 seconds. Thus, the perceived bit rate can be computed, in bits per second, at index time "i" as:

$$BR(i) = \frac{1}{T'}\left[\left(\sum_{j=0}^{N(i)-1} P_u(i-j)\right) + \left(P_u(i-N(i)) \cdot \left[\frac{T' - \sum_{j=0}^{N(i)-1} \Delta T_u(i-j)}{\Delta T_u(i-N(i))}\right]\right)\right] \quad \text{(Equation 8)}$$

where $$T' = \min\left(T, \sum_{j=0}^{i} \Delta T_u(i-j)\right),$$

T is a predetermined time period, for example, 30 seconds, and N(i) is the largest integer such that:

$$\sum_{j=0}^{N(i)-1} \Delta T_u(i-j) < T'$$

It should be noted that T' is less than T only during the initial phases of calculating the bit rate. After that time, time period T will be used.

Basically, N(i) is a number of entire RATUs in a T' time period. It is suggested that N(i) should be limited to a maximum number of transactions, for example, 100.

One can see by equation (8) that the bit rate is calculated as the number of data bits exchanged during the last N(i) RATUs, which cover a time period no greater than T', plus the number of data bits in a next RATU multiplied by a fraction comprising T' minus the sum of the differences between the first response and last acknowledgement of the last N(i) RATUs with a denominator equal to the time difference between a first response and a last acknowledgement of the next RATU. Thus, only a fraction of the bits in the last RATU are counted in the calculation in order to account for a total time period of T'.

A method for estimating the perceived bit rate in a second embodiment of the invention is defined by the formula:

$$BR(i) = \frac{1}{T'}[BR(i-1) \cdot (T' - \Delta T_u(i)) + P_u(i)] \quad \text{[Equation 9]}$$

if $\Delta T_u(i) < T'$, and $$BR(i) = \frac{P_u(i)}{\Delta T_u(i)}, \text{ if } \Delta T_u(i) \geq T' \quad \text{[Equation 10]}$$

where BR(i) is a bit rate at an index time i, $$T' = \min\left(T, \sum_{j=0}^{i} \Delta T_u(i-j)\right),$$

T is the time period, for example, 30 seconds, $\Delta T_u(i)$ is a time difference from a first response and a last acknowledgement within an $i^{th}$ transaction unit, and $P_u(i)$ is a total amount of data exchanged during the $i^{th}$ transaction unit.

Thus, if the time difference between the first response and last acknowledgement of a last received RATU is less than T', then the perceived bit rate, BR(i) can be estimated by the formula of Equation (9), otherwise, the formula of Equation (10) can be used to estimate the perceived bit rate.

Using the formulas of Equations (9) and (10) the perceived bit rate BR(i) provides a new update for every RATU. It should be noted that the perceived bit rate can be evaluated at the application layer or at a transport layer, for example, WTP layer or TCP layer. If the formula is implemented at the transport layer, the perceived bit rate can be determined in a centralized fashion. If the formula is implemented at the application layer, the bit rate would be estimated for each application.

Figure 4:
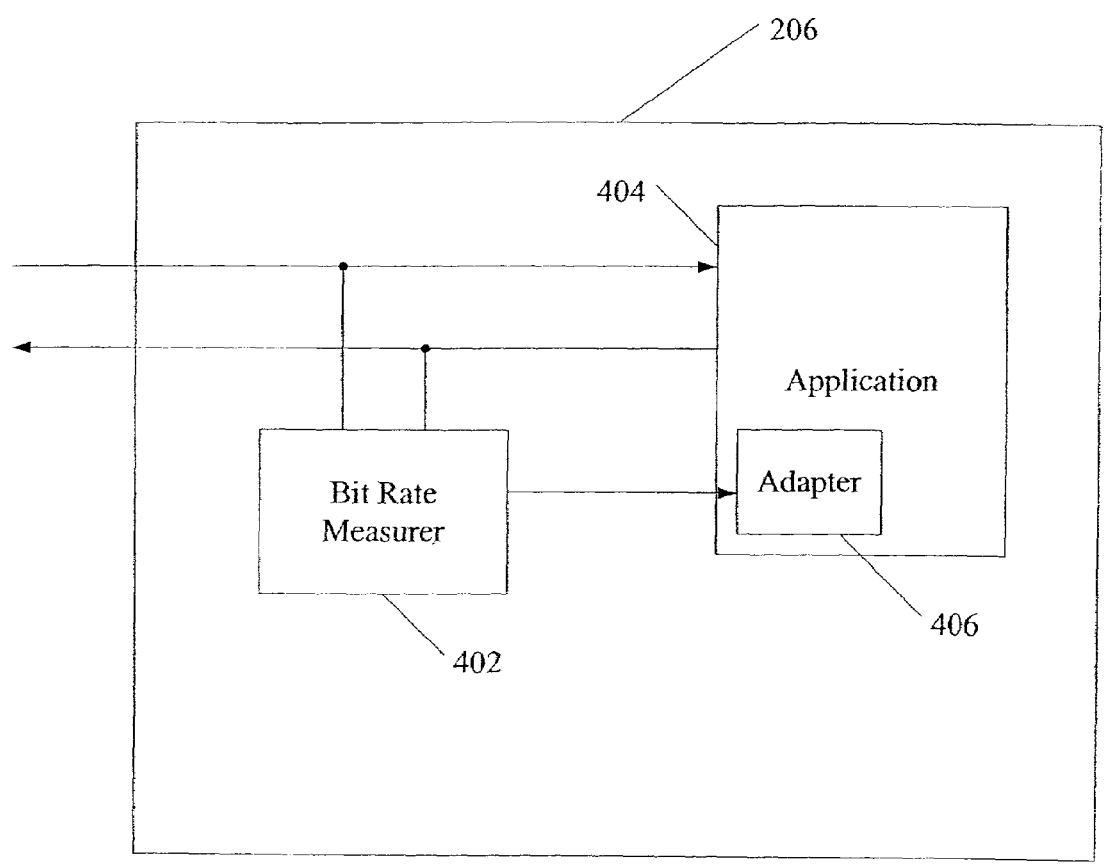
FIG. 4 a functional diagram of an embodiment of the invention having a bit rate measurer included in the server.

FIG. 4 is a functional diagram of an embodiment of the invention. FIG. 4 shows server 206, which has bit rate measurer 402 to measure the perceived bit rate. Bit rate measurer 402 can measure the perceived bit rate according to either Equation (8) or Equations (9) and (10), discussed previously. Bit rate measurer 402 provides an indication of the perceived bit rate to adapter 406, which may be either within the application or outside of the application, but communicates with an application 404. Adapter 406 adapts content sent from application 404 to the client 202 based on the perceived bit rate. This adaptation may include choosing a specific file from among multiple versions of the file, extracting parts of a scalable content or performing processing on the content to better fit the network bit rate and keep the waiting time for the user at the client under control. For example, a lower-resolution image can be sent during low bit rate conditions.

Figure 5A:
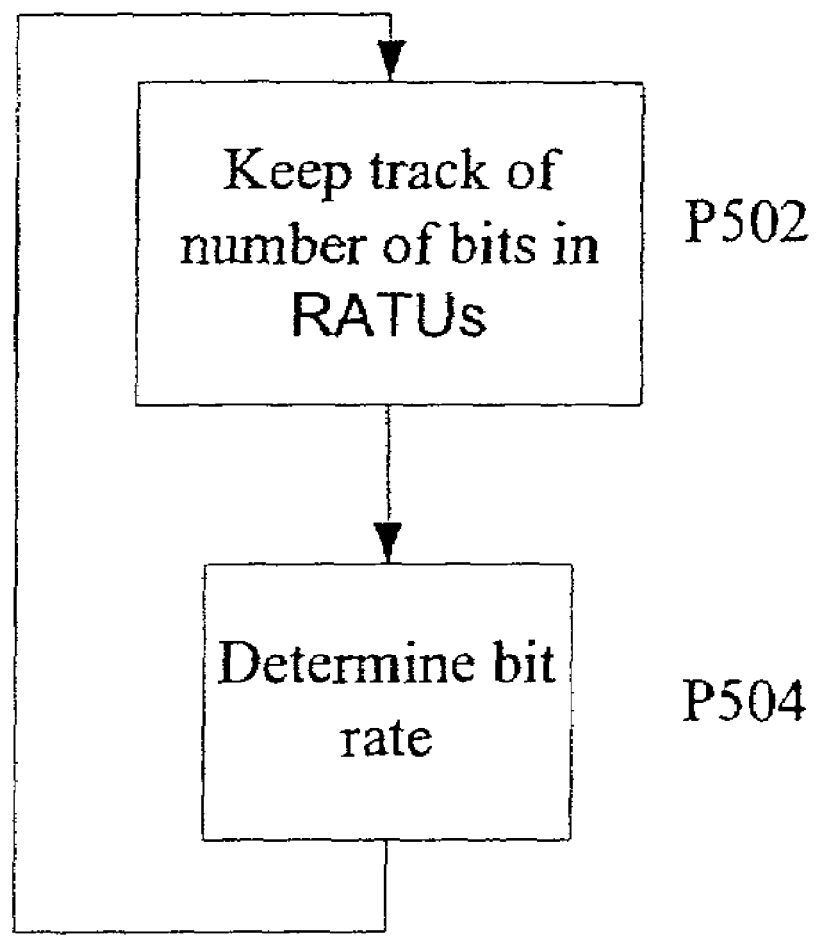
FIG. 5A is a flowchart showing the processing performed by the bit rate measurer in the server in an embodiment of the invention.

FIG. 5A is a flow chart which explains the processing performed by the bit rate measurer 402. It will be appreciated that bits can be grouped into bytes or other units of measure without departing from the inventive principles.

At P502, the bit rate measurer keeps track of the number of bits in the RATUs.

At P504, a perceived bit rate is determined using either Equation (8) or Equations (9) and (10).

P502 through P504 will be repeatedly executed to continuously determine the perceived bit rate.

Figure 5B:
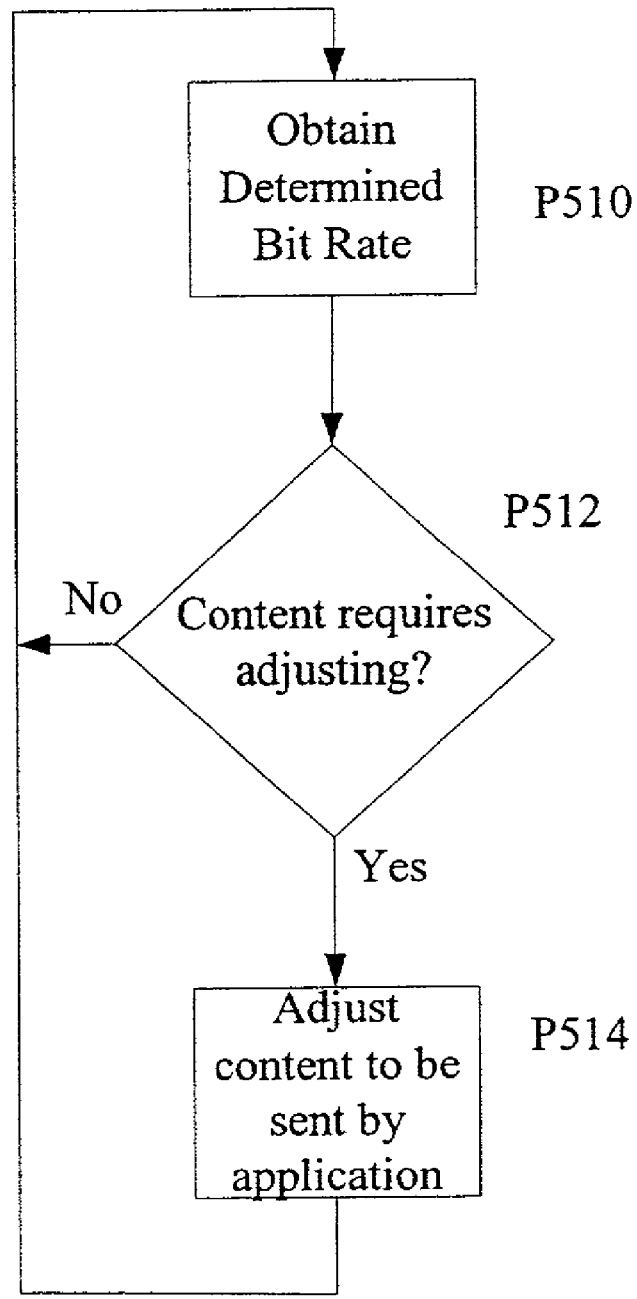
FIG. 5B is a flowchart illustrating the processing performed by the adapter.

FIG. 5B is a flow chart which illustrates the processing in the adapter 406.

At P510, the bit rate determined at P504 is obtained by, for example, accessing the determined bit rate that is stored, for example, in a computer memory shared with bit rate measurer 402.

At P512, a determination is made as to whether content from the application requires adjusting. This determination can be made by comparing the perceived bit rate to thresholds or ranges. When a change occurs because a threshold has been crossed or a new range has been entered, then the content from the application requires adjusting. Note that the thresholds or ranges may be, for example, predetermined, or may be set by the application.

If the content requires adjusting, then at P514, the adapter adjusts the content. This may be performed by the adapter informing the application to choose a specific file from among multiple versions of the file, extracting parts of a scalable content or performing processing on the content to better fit the network bit rate and keep the waiting time for the user at the client under control.

If, at act P512, a determination is made that the content does not require adjusting, processing proceeds to P510.

Acts P510 through P514 will be continuously repeated to adjust the content accordingly.

In another embodiment of the invention, the bit rate measurements are performed in the client. In the client, each Request/Response Transaction Pair (RRTP), also referred to as $T_{rr}(i)$, where "i" is an index, between the client and server is characterized by an amount of data exchanged P(i) equal to the sum of the bits of the request and response transaction pair, the time, in seconds, that the request was sent, $T_{req}(i)$, and the time, in seconds, that the response was received $T_{resp}(i)$. In FIG. 3A, time $T_{req}(i)$ corresponds to time $T_0$ and $T_{resp}(i)$ corresponds to time $T_3$.

An RRTU, also referred to as $T_{ru}(i)$, where i is an index, is a minimal set of RRTP which do not overlap in time with any other RRTP.

Mathematically, an RRTU is a set of RRTP, or $T_{rr}(k)$ with indices in a set S such that:

$$[T_{req}(k), T_{resp}(k)] \cap [T_{req}(i), T_{resp}(i)] = \{ \}, \forall k \in S, \forall (i) \in S,$$ [Equation 11]

where $[T_{req}(k), T_{resp}(k)]$ represents a time interval from $T_{req}(k)$ to $T_{resp}(k)$. S is a minimal set, such that there do not exist non-empty sets $S_1$ and $S_2$ such that $S_1 \cup S_2 = S$ and $S_1 \cap S_2 = \{ \}$, and that:

$$[T_{req}(k), T_{resp}(k)] \cap [T_{req}(i), T_{resp}(i)] = \{\}, \forall k \in S_1, \forall i \in S_2.$$ [Equation 12]

In FIG. 3B, one can see, from the client's perspective, that the first RRTU begins at time $T_0$ and ends at $T_9$ due to overlap of the RRTPs corresponding to transactions N and N+1. In FIG. 3C, one can see, from the client's perspective, that the first RRTU begins at time $T_0$ and ends at $T_9$ due to overlap of the RRTPs corresponding to transactions N and N+1.

As discussed previously with regard to RATUs, an RRTU is characterized by the total amount of data exchanged during the period it covers defined as:

$$P_u(j) = \sum_{i \in S_j} P(i),$$ [Equation 13]

where $P_u(j)$ is the total amount of data in $j^{th}$ RRTU and P(i) is the total amount of data in an $i^{th}$ RRTP composing the RRTU. $S_j$ is the set of indices, corresponding to RRTPs, composing the $j^{th}$ RRTU).

The time (in seconds) in which the first RRTP request was sent is defined as:

$$T_{Req}^u(j) = \operatorname*{Min}_{i \in S_j}[T_{Req}(i)],$$ [Equation 14]

where j is an index, such that $T_{req}^u(j)$ corresponds to a request in the $j^{th}$ RRTU and $S_j$ refers to the set of indices, corresponding to RRTUs, within the RRTP.

The time (in seconds) where the last RRTP response was received is defined as:

$$T_{Resp}^u(j) = \operatorname*{Max}_{i \in S}[T_{Resp}(i)]$$ [Equation 15]

The time difference between a first request and a last response in an RATU is defined as:

$$\Delta T_u(j) = T_{Resp}^u(j) - T_{req}^u(j)$$ [Equation 16]

Each RRTU, $T_{ru}(j)$, is ordered such that:

$$T_{Req}^u(j-1) < T_{Req}^u(j) < T_{Req}^u(j+1), \forall j > 0$$ [Equation 17]

In the notation, $T_{ru}(j)$ for j=0, 1, 2, 3, . . . , j=0 corresponds to the first RRTU.

In this embodiment of the invention, the bit rate is estimated as an average amount of data transferred over a specific period of time T, for example, 30 seconds. Thus, the perceived bit rate can be computed, in bits per second, at index time "i" as defined using equation (8), with reference to equations (13) through (17) instead of equations (3) through (7).

Basically, N(i) is a number of entire RRTUs in a T' time period. It is suggested that N(i) should be limited to a maximum number of transactions, for example, 100.

One can see by equation (8) that the bit rate is calculated as the number of data bits exchanged during the last N(i) RRTUs, which cover a time period no greater than T', plus the number of data bits in a next RRTU multiplied by a fraction comprising T' minus the sum of the differences between the first request and last response of the last N(i) RRTUs with a denominator equal to the time difference between a first request and a last response of the next RATU. Thus, only a fraction of the bits in the last RATU are counted in the calculation in order to account for a total time period of T'.

A method for estimating the perceived bit rate in the client in another embodiment of the invention is defined by the formula of equations (9) and (10) with reference to equations (13) through (17) instead of equations (3) through (7).

With reference to equations (9) and (10) $\Delta T_u(i)$ is redefined as a time difference from a first request and a last response within an $i^{th}$ transaction unit, and $P_{tr}(i)$ is a total amount of data exchanged during the $i^{th}$ RRTU.

Thus, if the time difference between the first request and the last response of a last received RRTU is less than T', then the perceived bit rate, BR(i) can be estimated by the formula of Equation (9), otherwise, the formula of Equation (10) can be used to estimate the perceived bit rate.

Using the formulas of Equations (9) and (10) the perceived bit rate BR(i) provides a new update for every RRTU. It should be noted that the perceived bit rate can be evaluated at the application layer or at a transport layer, for example, WTP layer or TCP layer. If the formula is implemented at the transport layer, the perceived bit rate can be determined in a centralized fashion. If the formula is implemented at the application layer, the bit rate would be estimated for each application.

Figure 6:
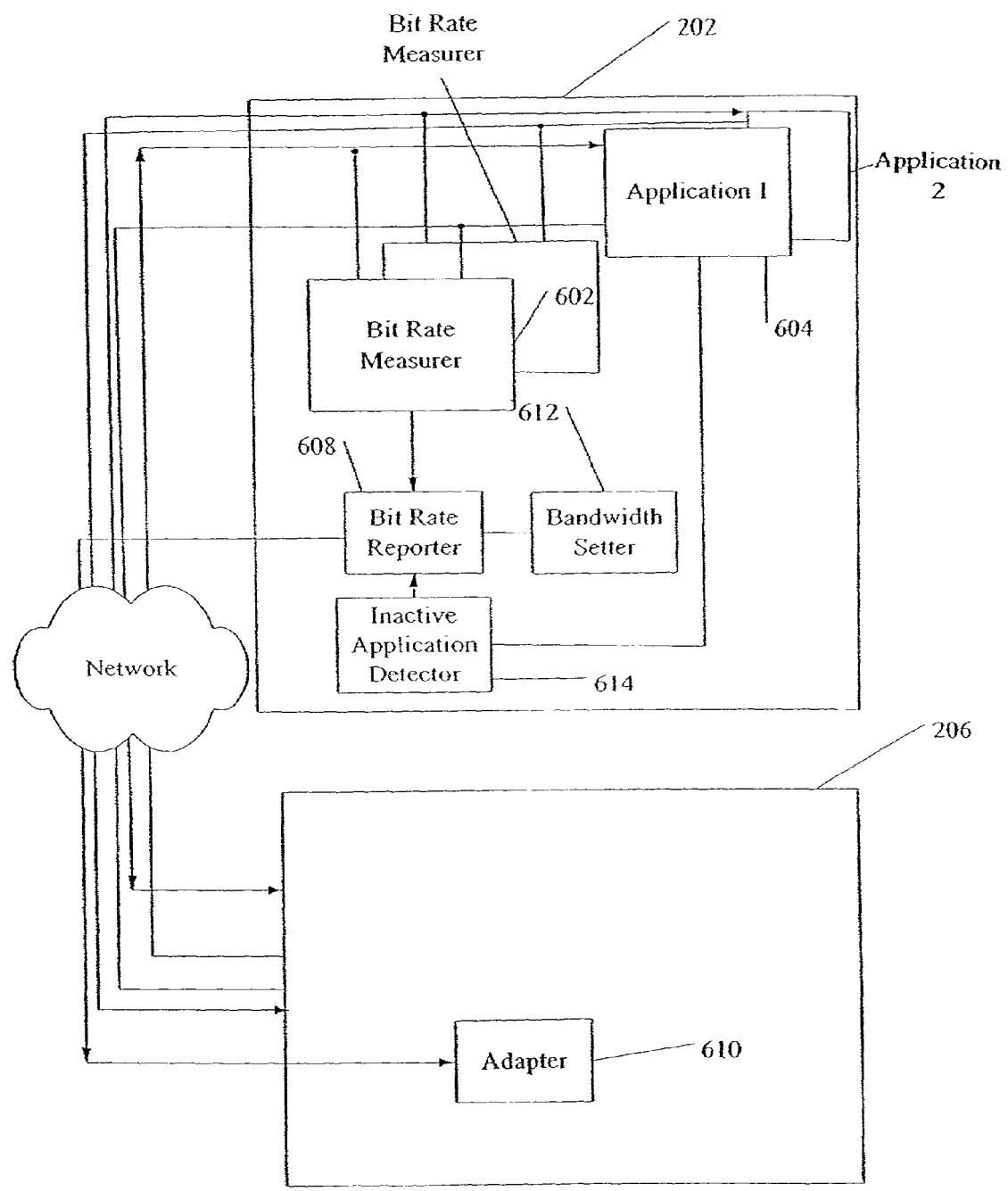
FIG. 6 is a functional block diagram of a client and a server in an embodiment of the invention having the bit rate measurer in the client.

FIG. 6 illustrates a functional block diagram of the client and server in an embodiment of the invention having a bit rate measurer in the client. The client 202 includes the bit rate measurer 602 to measure the bit rate using a method which utilizes, for example, Equation (8) or Equations (9) and (10). The bit rate of data traveling between application 604 in the client and server 206 is measured by bit rate measurer 602.

Bit rate reporter 608 reports the perceived bit rate to the server 206. The perceived bit rate is received by adapter 610 in the server which causes the server to adjust content sent to the client, as previously described in regard to FIG. 4.

The bit rate reporter 608 may report the bit rate, for example, in a UAPROF descriptor in the Wireless Access Protocol (WAP). FIG. 7 shows a table which describes suggested new UAPROF descriptors.

In an embodiment of the invention, the bit rate reporter may be implemented at the application level to monitor the perceived bit rate of data to and from separate applications in the client. FIG. 6 shows two applications in the client, both of which are monitored separately by bit rate measurers. Of course, more than two applications may be monitored in the client. Further, the applications in the client may be communicating with different servers. Thus multiple bit rate reporters would be used in such a case.

In the table, the entry "Bit Rate" describes the bit rate in exact terms, for example, "9600", a range, for example, "9600-14400", or a relative rate, for example, high, medium, or low.

Desired bit rate is a maximum bit rate at which the device wishes to receive data. This can be reported as, for example, an exact value such as "14400".

The bandwidth setter 612 allows a desired bandwidth to be set for the application. This may be achieved by, for example, the application setting a particular value into a specific memory location on the client. The bandwidth setter detects the value in the specific memory location and informs the bit rate reporter 608 to send a message including the desired bandwidth to the server using, for example, a UAPROF message, as described in the table of FIG. 7. In embodiments of the invention, the desired bit rate may be reserved, such that no other application can use that bandwidth even during times of inactivity by the application.

Inactive application detector 614 determines that an application has been inactive for a predetermined period of time. If the application has not reserved a specific amount of bandwidth, then the inactive application detector 614 informs the bit rate reporter 608 to contact other applications on one or more servers to adjust the desired bit rate for communicating with the client by, for example, having each application send a desired bit rate message to respective servers to lower the respective application's bit rate and sending desired bit rate messages for active applications to increase the active applications'desired bit rate, thereby indicating a desire to use the bit rate previously used by the inactive application.

Figure 8:
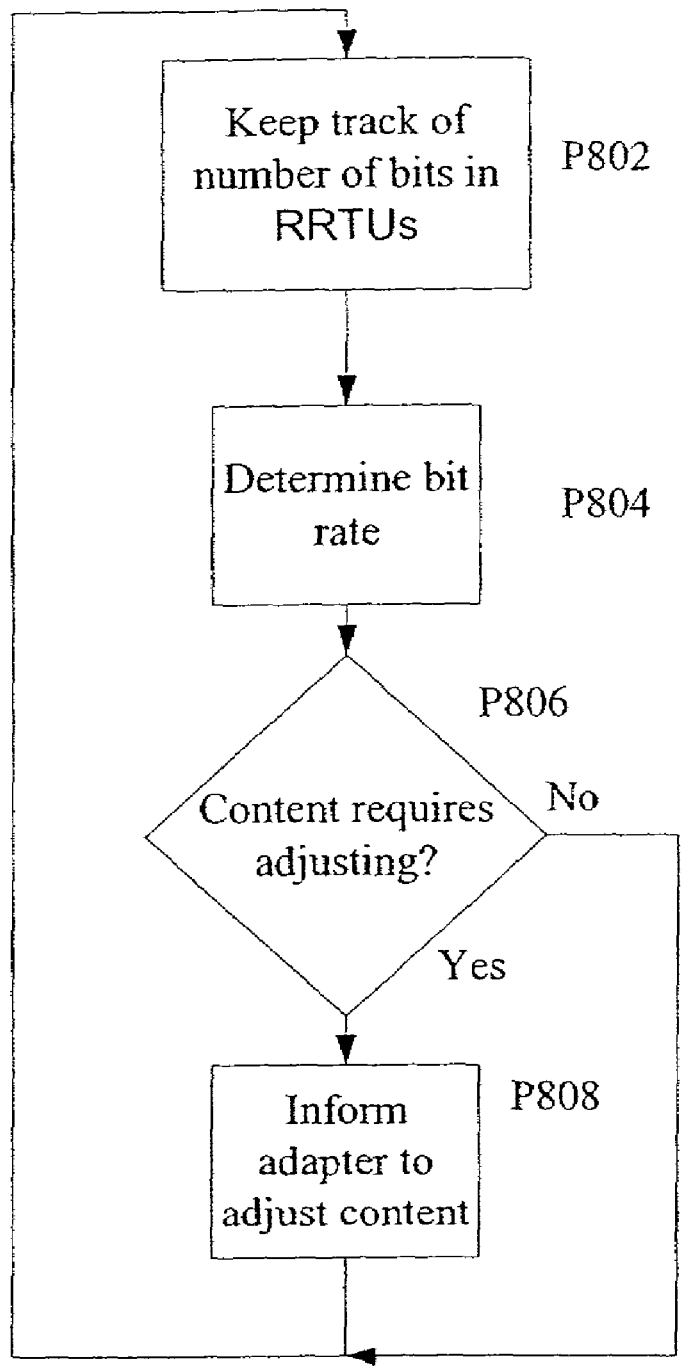
FIG. 8 is a flowchart showing the processing performed by the bit rate measurer in the client in an embodiment of the invention.

FIG. 8 illustrates a flow chart which shows the processing of the bit rate measurer.

At P802, the bit rate measurer keeps track of the number of bits in each of the RRTUs.

At P804, the bit rate is determined using, for example, Equation (8) or Equations (9) and (10).

At P806, a determination is made as to whether a change in the perceived bit rate requires reporting to the adaptor. If there is no change or only a slight change in the bit rate, as compared to a pre-determined minimum change in percent, for instance, no reporting is required. If reporting is to be performed, at P808, the adaptor is informed to adjust the content.

Figure 9:
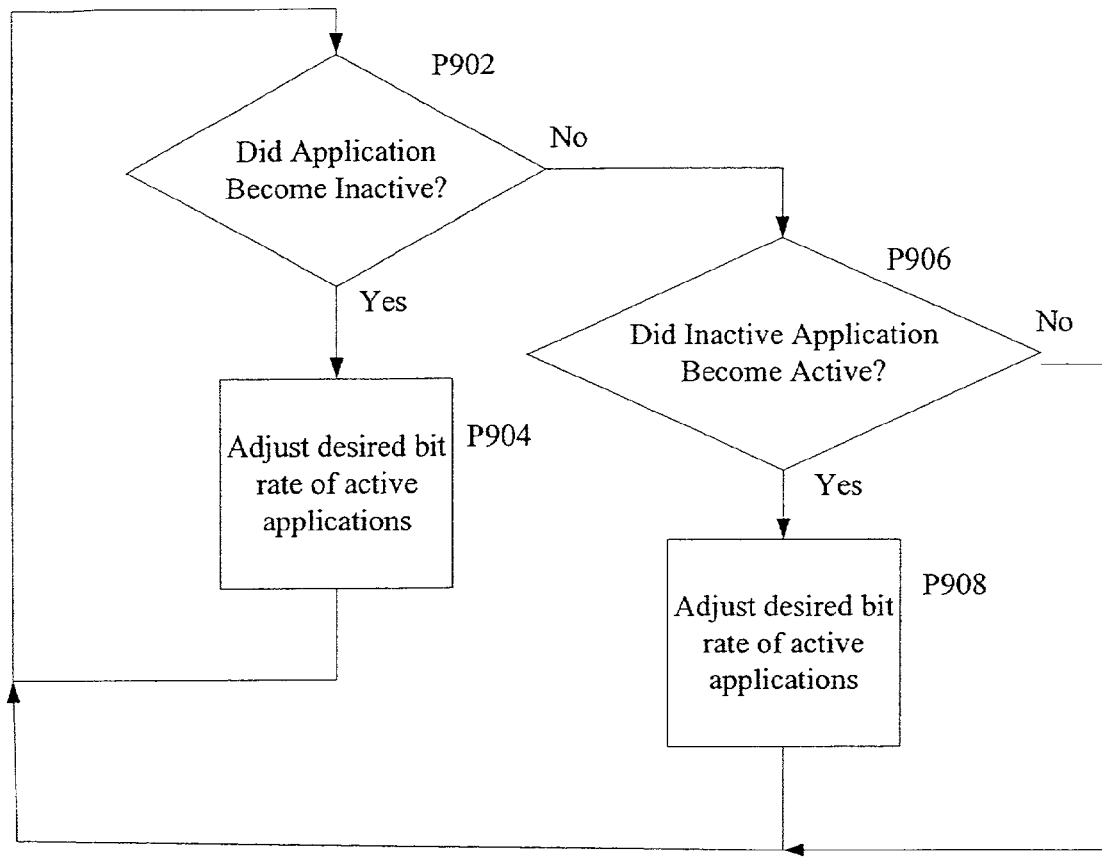
FIG. 9 is a flowchart illustrating the processing in an embodiment of the inactive application detector.

FIG. 9 is a flowchart which illustrates the processing in an embodiment of the inactive application detector. The inactive application detector may determine that an application is inactive by observing that no bits have been measured going to or from an application for a predetermined period of time.

At P902, a determination is made as to whether an application just became inactive. If so, P904 is performed to adjust the desired bit rate of the active applications to use the bandwidth of the inactive application. This is done, for example, by sending a desired bit rate message to the server informing the server of a change in the desired bit rate of each of the applications.

If, at P902, it is determined that an application did not become inactive, then a check is made at P906 to determine whether a previously inactive application became active. If so, desired bit rate messages are sent to the server to adjust the bit rate of the active applications and to inform the server that the previously inactive application now has a changed desired bit rate so that additional traffic may be sent to and from the application.

Embodiments of the invention may be implemented in hardware, software, or a combination of hardware and software. Further, machine instructions for a processor within the client or the server may be stored on a medium, such as, for example, floppy disk or CD ROM. The machine instructions include instructions for the processor in the client or the server to perform methods described herein.

While the invention has been described with reference to certain illustrated embodiments, the words that have been used herein are words of description, rather than words of limitation. Changes may be made within the purview of the appended claims without departing from the scope and spirit of the invention in its aspects. Although the invention has been described herein with respect to particular structures, acts and materials, the invention is not to be limited to the particulars disclosed, but rather extends to all equivalent structures, acts, and materials, such as are within the scope of the appended claims. In particular, the method for measuring the bit rate is not limited to WAP, but is applicable to any protocol exhibiting a similar request-response-acknowledgement or request-response behaviour. In particular, descriptors other than UAProf may be used to transmit the bit rate computed on a client device to a server or gateway.

What is claimed is:

1. A method to measure a perceived bit rate between a client and a server, the method comprising:
(1) identifying at least one transaction unit, said transaction unit including one or more message pairs;

(2a) if said transaction unit has only a single message pair, confirming that said single message pair does not overlap other message pairs outside of the transaction unit;
(2b) if said transaction unit has a plurality of message pairs, confirming that said message pairs are overlapping;
(3) measuring a number of bits transmitted between the client and the server over a duration of said at least one transaction unit, wherein said measuring is performed at an application level within the client, such that a perceived bit rate is measured for a plurality of applications executing on the client; and
(4) adapting, by the server, a type of content to be sent to the client based on a measurement determined during act (3).

2. The method of claim 1, wherein:
the number of bits measured are included in a plurality of transaction units, and
the duration of act (3) is the sum of time durations of each of the plurality of transaction units.

3. The method of claim 1, wherein act (3) is performed on the server and duration of said at least one transaction unit is an amount of time from a beginning of a transmission, from the server, of a first response within the respective transaction unit to a time of a receipt, by the server, of a last acknowledgement within the respective transaction unit.

4. The method of claim 1, wherein act (4) further comprises adapting a resolution of an image to be sent to the client.

5. The method of claim 1, wherein act (3) is performed on the client and the duration of said at least one transaction unit is an amount of time from a beginning of a transmission of a first request, from the client, within the respective transaction unit to a time of a receipt, by the client, of a last response within the respective transaction unit.

6. The method of claim 5, further comprising: (5) reporting a bit rate to the server from the client, the bit rate being based on a measurement obtained during act (3).

7. The method of claim 6, wherein the bit rate is reported in a form of a range of bit rates.

8. The method of claim 6, wherein the bit rate is reported in a form of an exact bit rate.

9. The method of claim 6, wherein the bit rate is reported in a form of one of a plurality of types, each type reflecting a relative speed of the bit rate.

10. The method of claim 6, wherein act (3) is performed at an application level within the client, such that a perceived bit rate is measured for a plurality of applications executing on the client.

11. The method of claim 10, wherein the reporting of the bit rate to the server is performed for each of the plurality of applications.

12. The method of claim 11, further comprising:
setting an amount of bandwidth desired for at least one of the applications; and
reserving, by the server, the amount of bandwidth requested by the at least one of the applications.

13. The method of claim 12, further comprising:
detecting, by the client, when one of the applications is inactive for a specified period of time;
reporting, by the client to the server, that one of the applications is inactive when the detecting determines that the one of the applications is inactive for the specified period of time; and reallocating, by the server, the amount of the bandwidth to other applications after receiving a report from the reporting.

14. A machine-readable medium having recorded thereon instructions for a processor, the instructions comprising:
(1) identifying at least one transaction unit, said transaction unit including one or more message pairs;
(2a) if said transaction unit has only a single message pair, confirming that said single message pair does not overlap other message pairs outside of the transaction unit;
(2b) if said transaction unit has a plurality of message pairs, confirming that said message pairs are overlapping;
(3) measuring a number of bits transmitted between a client and a server over a duration of said at least one transaction unit, wherein said measuring is performed at an application level within the client, such that a perceived bit rate is measured for a plurality of applications executing on the client; and
(4) adapting, by the server, a type of content to be sent to the client based on a measurement determined during act (3).

15. The machine-readable medium of claim 14, wherein the instructions for performing act (3) cause act (3) to be performed on the server and the duration of said at least one transaction unit is an amount of time from a beginning of a transmission, from the server, of a first response within the respective transaction unit to a time of a receipt, by the server, of a last acknowledgement within the respective transaction unit.

16. The machine-readable medium of claim 14, wherein the instructions for performing act (3) cause act (3) to be performed by the client and the duration of said at least one transaction unit is an amount of time from a beginning of a transmission of a first request, from the client, within the respective transaction unit to a time of a receipt, by the client, of a last response within the respective transaction unit.

17. The machine-readable medium of claim 16, further comprising instructions for reporting a bit rate to the server from the client, the bit rate being based on a measurement obtained during act (3).

18. The machine-readable medium of claim 17, wherein the instructions for performing act (3) cause act (3) to be performed at an application level within the client, such that a perceived bit rate is measured for a plurality of applications executing on the client.

19. The machine-readable medium of claim 18, wherein the reporting of the bit rate to the server is performed for each of the plurality of applications.

20. The machine-readable medium of claim 19, further comprising instructions for:
setting an amount of bandwidth desired for at least one of the applications.

21. The machine-readable medium of claim 20, further comprising instructions for:
detecting, by the client, when one of the applications is inactive for a specified period of time; and
reporting, by the client to the server, that one of the applications is inactive when the detecting determines that the one of the applications is inactive for the specified period of time.

22. An apparatus for measuring a perceived bit rate between the apparatus and a second apparatus, the apparatus comprising:

a bit rate measurer to measure a number of bits transmitted between the apparatus and the second apparatus over a time period; and an adapter to adapt a type of content to be sent to the second apparatus based on a measurement determined by the bit rate measurer, wherein:

the number of bits measured are those included only within at least one transaction unit, wherein said at least one transaction unit has one or more transaction pairs that do not overlap with transaction pairs outside of the transaction unit, and wherein if said transaction unit has a plurality of transaction pairs, said plurality of transaction pairs are overlapping, and the time period is a sum of time durations of each of the at least one transaction unit, wherein the bit rate measurer is arranged to measure the bit rate at an application level within the first apparatus, such that a perceived bit rate is measured for a plurality of applications executing on the first apparatus.

23. The apparatus of claim 22, wherein the apparatus functions as a server and the second apparatus functions as a client and the duration of said at least one transaction unit is an amount of time from a beginning of a transmission, from the server, of a first response within the respective transaction unit to a time of a receipt, by the server, of a last acknowledgement within the respective transaction unit.

24. An apparatus for measuring a perceived bit rate between the apparatus and a second apparatus, the apparatus comprising:

a bit rate measurer to measure a number of bits transmitted between the apparatus and the second apparatus over a time period; and a bit rate reporter to report the bit rate to the second apparatus, functioning as the server, the bit rate being based on a measurement determined by the bit rate measurer, wherein:

the number of bits measured are those included only within at least one transaction unit, wherein said at least one transaction unit has one or more transaction pairs that do not overlap with transaction pairs outside of the transaction unit, and wherein if said transaction unit has a plurality of transaction pairs, said plurality of transaction pairs are overlapping:

the time period is a sum of time durations of each of the at least one transaction unit, and the bit rate measurer is arranged to measure the bit rate at an application level within the first apparatus, such that a perceived bit rate is measured for a plurality of applications executing on the first apparatus.

25. The apparatus of claim 24, wherein the apparatus is arranged to function as a client, the second apparatus is arranged to function as a server and the duration of said at least one transaction unit is an amount of time from a beginning of a transmission of a first request, from the client, within the respective transaction unit to a time of a receipt, by the client, of a last response within the respective transaction unit.

26. The apparatus of claim 24, wherein the bit rate reporter is arranged to report the bit rate to the server for each of the plurality of applications.

27. The apparatus of claim 26, further comprising:
a bandwidth setter to allow a setting of an amount of bandwidth desired for at least one of the applications.

28. The apparatus of claim 27, further comprising:
an inactive application detector to detect when one of the applications is inactive for a specified period of time, the inactive application detector being arranged to report to the server that one of the applications is inactive when the inactive application detector determines that the one of the applications is inactive for the specified period of time.

29. A system for measuring a perceived bit rate, comprising:

a first apparatus configured to function as a server and including an adaptor; and a second apparatus configured to function as a client comprising:

a bit rate measurer to measure a number of bits transmitted between the second apparatus and the first apparatus over a predetermined time period, wherein:

the adaptor is configured to adapt a type of content to be sent to the second apparatus based on a measurement determined by the bit rate measurer, the number of bits measured are those included only within at least one transaction unit, wherein said at least one transaction unit has one or more transaction pairs that do not overlap with transaction pairs outside of the transaction unit, and wherein if said transaction unit has a plurality of transaction pairs, said plurality of transaction pairs are overlapping, and the time period is a sum of time durations of each of the at least one transaction unit, wherein the bit rate measurer is arranged to measure the bit rate at an application level within the client, such that a perceived bit rate is measured for a plurality of applications executing on the client.

30. The system of claim 29, wherein the bit rate measurer is arranged to measure the bit rate according to a formula:

$$BR(i) = \frac{1}{T'}\left[\left(\sum_{j=0}^{N(i)-1} P_u(i-j)\right) + \left(P_u(i-N(i)) \cdot \left[\frac{T' - \sum_{j=0}^{N(i)-1} \Delta T_u(i-j)}{\Delta T_u(i-N(i))}\right]\right)\right],$$

where BR(i) is a bit rate at an index time i, $$T' = \mathrm{Min}\left(T, \sum_{j=0}^{i} \Delta T_u(i-j)\right),$$

T is the time period, $\Delta T_u(i-j)$ is a time difference from a first request sent from the second apparatus and a last response received by the second apparatus from the first apparatus within a $(i-j)^{th}$ transaction unit, $P_u(i-j)$ is a total amount of data exchanged during the $(i-j)^{th}$ transaction unit, and N(i) is a largest integer, such that $$\sum_{j=0}^{N(i)-1} \Delta T_u(i-j) < T'.$$

31. The system of claim 29, wherein the bit rate measurer is arranged to measure the bit rate according to a formula:

$$BR(i) = \frac{1}{T'}[BR(i-1) \cdot (T' - \Delta T_u(i)) + P_u(i)],$$

where BR(i) is a bit rate at an index time i, $$T' = \text{Min}\left(T, \sum_{j=0}^{i} \Delta T_u(i-j)\right),$$

T is the time period, $\Delta T_u(i)$ is a difference from a first request sent from the second apparatus and a last response received by the second apparatus from the first apparatus within an $i^{th}$ transaction unit, and $P_u(i)$ is a total amount of data exchanged during the $i^{th}$ transaction unit.

32. The system of claim 29, wherein the second apparatus further comprises a bit rate reporter to report the bit rate to the first apparatus, the bit rate being based on a measurement determined by the bit rate measurer.

33. A mobile terminal for sending and receiving data wirelessly, the mobile terminal comprising:
 a bit rate measurer to measure a number of bits transmitted between the mobile terminal and a server over a time period, wherein:
 the number of bits measured are those included only within each of a plurality of transaction units, wherein said transaction units each have one or more transaction pairs that do not overlap with transaction pairs outside of the transaction unit, and wherein if said transaction unit has a plurality of transaction pairs, said plurality of transaction pairs are overlapping,
 the time period is a sum of time durations of each of the transaction units, and
 the bit rate measurer is arranged to measure the bit rate at an application level within the mobile terminal, such that a perceived bit rate is measured for a plurality of applications executing on the mobile terminal.

34. A server for communicating with a client, the server comprising:
 a bit rate measurer to measure a number of bits transmitted between the server and the client over a time period;
 an adapter to adapt content to be sent to the client based on a measurement determined by the bit rate measurer, wherein:
 the number of bits measured are those included only within at least one transaction unit,
 the time period is a sum of time durations of each of the at least one transaction unit,
 a respective one of the time durations is an amount of time from a beginning of a transmission, from the server, of a first response within the respective transaction unit to a time of a receipt, by the server, of a last acknowledgement within the respective transaction unit, and
 the bit rate measurer is configured to measure the bit rate according to a formula:

$$BR(i) =$$

-continued $$\frac{1}{T'}\left[\left(\sum_{j=0}^{N(i)-1} P_u(i-j)\right) + \left(P_u(i-N(i)) \cdot \left[\frac{T' - \sum_{j=0}^{N(i)-1} \Delta T_u(i-j)}{\Delta T_u(i-N(i))}\right]\right)\right],$$

where BR(i) is a bit rate at an index time i, $$T' = \text{Min}\left(T, \sum_{j=0}^{i} \Delta T_u(i-j)\right),$$

T is the time period, $\Delta T_u(i)$ is a time difference from a first response and a last acknowledgement within an $i^{th}$ transaction unit, and $P_u(i)$ is a total amount of data exchanged during the $i^{th}$ transaction unit.

35. A method to measure a perceived bit rate between a client and a server, the method comprising:
 (1) measuring a number of bits transmitted between the client and the server over a time period, wherein:
 the number of bits measured are included only within at least one transaction unit,
 the time period is a sum of time durations of each of the at least one transaction unit, and
 act (1) is performed by the server according to a formula:

$$BR(i) = \frac{1}{T'}\left[\left(\sum_{j=0}^{N(i)-1} P_u(i-j)\right) + \left(P_u(i-N(i)) \cdot \left[\frac{T' - \sum_{j=0}^{N(i)-1} \Delta T_u(i-j)}{\Delta T_u(i-N(i))}\right]\right)\right],$$

where BR(i) is a bit rate at an index time i, $$T' = \text{Min}\left(T, \sum_{j=0}^{i} \Delta T_u(i-j)\right),$$

T is the time period, $\Delta T_u(i-j)$ is a time difference from a first response and a last acknowledgement within a $(i-j)^{th}$ transaction unit, $P_u(i-j)$ is a total amount of data exchanged during the $(i-j)^{th}$ transaction unit, and N(i) is a largest integer, such that $$\sum_{j=0}^{N(i)-1} \Delta T_u(i-j) < T'.$$

36. A method to measure a perceived bit rate between a client and a server, the method comprising:
 (1) measuring a number of bits transmitted between the client and the server over a time period, wherein:
 the number of bits measured are included only within at least one transaction unit,
 the time period is a sum of time durations of each of the at least one transaction unit, and
 act (1) is performed by the server according to a formula:

$$BR(i) = \frac{1}{T'}[BR(i-1) \cdot (T' - \Delta T_u(i)) + P_u(i)],$$

where BR(i) is a bit rate at an index time i, $$T' = \text{Min}\left(T, \sum_{j=0}^{i} \Delta T_u(i-j)\right),$$

T is the time period, $\Delta T_u(i)$ is a time difference from a first response and a last acknowledgement within an $i^{th}$ transaction unit, and $P_u(i)$ is a total amount of data exchanged during the $i^{th}$ transaction unit.

37. A method to measure a perceived bit rate between a client and a server, the method comprising:
    (1) measuring a number of bits transmitted between the client and the server over a time period, wherein:
    the number of bits measured are included only within at least one transaction unit,
    the time period is a sum of time durations of each of the at least one transaction unit, and
    act (1) is performed by the client according to a formula:

$$BR(i) = \frac{1}{T'}\left[\left(\sum_{j=0}^{N(i)-1} P_u(i-j)\right) + \left(P_u(i-N(i)) \cdot \left[\frac{T' - \sum_{j=0}^{N(i)-1} \Delta T_u(i,j)}{\Delta T_u(i-N(i))}\right]\right)\right],$$

where BR(i) is a bit rate at an index time i, $$T' = \text{Min}\left(T, \sum_{j=0}^{i} \Delta T_u(i-j)\right),$$

T is the time period, $\Delta T_u(i-j)$ is a time difference from a first request sent from the client and a last response received by the client from the server within a $(i-j)^{th}$ transaction unit, $P_u(i-j)$ is a total amount of data exchanged during the $(i-j)^{th}$ transaction unit, and N(i) is a largest integer, such that $$\sum_{j=0}^{N(i)-1} \Delta T_u(i-j) < T'.$$

38. A method to measure a perceived bit rate between a client and a server, the method comprising:
    (1) measuring a number of bits transmitted between the client and the server over a time period, wherein:
    the number of bits measured are included only within at least one transaction unit,
    the time period is a sum of time durations of each of the at least one transaction unit, and
    act (1) is performed by the client according to a formula:

$$BR(i) = \frac{1}{T'}[BR(i-1) \cdot (T' - \Delta T_u(i)) + P_u(i)],$$

where BR(i) is a bit rate at an index time i, $$T' = \text{Min}\left(T, \sum_{j=0}^{i} \Delta T_u(i-j)\right),$$

T is the time period, $\Delta T_u(i)$ is a time difference from a first request sent from the client and a last response received by the client from the server within an $i^{th}$ transaction unit, and $P_u(i)$ is a total amount of data exchanged during the $i^{th}$ transaction unit.

39. A machine-readable medium having recorded thereon instructions for a processor, the instructions comprising:
    (1) measuring a number of bits transmitted between a client and a server over a time period, wherein:
    the number of bits measured are those included only within each of a plurality of transaction units,
    the time period is a sum of time durations of each of the transaction units, and
    act (1) is configured to be performed by the server according to a formula:

$$BR(i) = \frac{1}{T'}\left[\left(\sum_{j=0}^{N(i)-1} P_u(i-j)\right) + \left(P_u(i-N(i)) \cdot \left[\frac{T' - \sum_{j=0}^{N(i)-1} \Delta T_u(i,j)}{\Delta T_u(i-N(i))}\right]\right)\right],$$

where BR(i) is a bit rate at an index time i, $$T' = \text{Min}\left(T, \sum_{j=0}^{i} \Delta T_u(i-j)\right),$$

T is the time period, $\Delta T_u(i-j)$ is a time difference from a first response and a last acknowledgement within a $(i-j)^{th}$ transaction unit, $P_u(i-j)$ is a total amount of data exchanged during the $(i-j)^{th}$ transaction unit, and N(i) is a largest integer, such that $$\sum_{j=0}^{N(i)-1} \Delta T_u(i-j) < T'.$$

40. A machine-readable medium having recorded thereon instructions for a processor, the instructions comprising:
    (1) measuring a number of bits transmitted between a client and a server over a time period, wherein:
    the number of bits measured are those included only within each of a plurality of transaction units,
    the time period is a sum of time durations of each of the transaction units,
    act (1) is configured to be performed by the server according to a formula:

$$BR(i) = \frac{1}{T'}[BR(i-1) \cdot (T' - \Delta T_u(i)) + P_u(i)],$$

where BR(i) is a bit rate at an index time i, $$T' = \text{Min}\left(T, \sum_{j=0}^{i} \Delta T_u(i-j)\right),$$

T is the time period, $\Delta T_u(i)$ is a time difference from a first response and a last acknowledgement within an $i^{th}$ transaction unit, and $P_u(i)$ is a total amount of data exchanged during the $i^{th}$ transaction unit.

41. A machine-readable medium having recorded thereon instructions for a processor, the instructions comprising:
   (1) measuring a number of bits transmitted between a client and a server over a time period, wherein:
   the number of bits measured are those included only within each of a plurality of transaction units,
   the time period is a sum of time durations of each of the transaction units, and
   act (1) is configured to be performed by the client according to a formula:

$$BR(i) = \frac{1}{T'}\left[\left(\sum_{j=0}^{N(i)-1} P_u(i-j)\right) + \left(P_u(i-N(i)) \cdot \left[\frac{T' - \sum_{j=0}^{N(i)-1} \Delta T_u(i,j)}{\Delta T_u(i-N(i))}\right]\right)\right],$$

where BR(i) is a bit rate at an index time i, $$T' = \text{Min}\left(T, \sum_{j=0}^{i} \Delta T_u(i-j)\right),$$

T is the time period, $\Delta T_u(i-j)$ is a time difference from a first request sent from the client and a last response received by the client from the server within a $(i-j)^{th}$ transaction unit, $P_u(i-j)$ is a total amount of data exchanged during the $(i-j)^{th}$ transaction unit, and N(i) is a largest integer, such that $$\sum_{j=0}^{N(i)-1} \Delta T_u(i,j) < T'.$$

42. A machine-readable medium having recorded thereon instructions for a processor, the instructions comprising:
   (1) measuring a number of bits transmitted between a client and a server over a time period, wherein:
   the number of bits measured are those included only within each of a plurality of transaction units,
   the time period is a sum of time durations of each of the transaction units, and
   act (1) is configured to be performed by the client according to a formula:

$$BR(i) = \frac{1}{T'}[BR(i-1) \cdot (T' - \Delta T_u(i)) + P_u(i)],$$

where BR(i) is a bit rate at an index time i, $$T' = \text{Min}\left(T, \sum_{j=0}^{i} \Delta T_u(i-j)\right),$$

T is the time period, $\Delta T_u(i)$ is a time difference from a first request sent from the client and a last response received by the client from the server within an $i^{th}$ transaction unit, and $P_u(i)$ is a total amount of data exchanged during the $i^{th}$ transaction unit.

* * * * *

UNITED STATES PATENT AND TRADEMARK OFFICE
CERTIFICATE OF CORRECTION

PATENT NO.       : 7,043,560 B2
APPLICATION NO.  : 09/883208
DATED            : May 9, 2006
INVENTOR(S)      : Stephanie Coulombe et al.

It is certified that error appears in the above-identified patent and that said Letters Patent is hereby corrected as shown below:

On the cover page, References Cited section (56), U.S. Patent Documents:
Please replace "2002/0185970" with --2002/0165970--

In Column 16, Claim 34, Lines 1-8:
Please replace the following formula:

"$$\frac{1}{T'}\left[\left(\sum_{j=0}^{N(i)-1} P_u(i-j)\right) + \left(P_u\left(i-N(i)\cdot\left[\frac{T'-\sum_{j=0}^{N(i)-1}\Delta T_u(i-j)}{\Delta T_u(i-N(i))}\right]\right)\right)\right],$$"

With the formula below:

$$BR(i) = \frac{1}{T'}\left[BR(i-1)\cdot\left(T'-\Delta T_u(i)\right) + P_u(i)\right],$$

Signed and Sealed this

Seventeenth Day of October, 2006

JON W. DUDAS
*Director of the United States Patent and Trademark Office*